INVENTORS R. W. DOWNING
R. J. HASS
BY John C Albrecht
ATTORNEY

Feb. 25, 1969 R. W. DOWNING ET AL 3,430,202

DATA PROCESSOR UTILIZING COMBINED ORDER INSTRUCTIONS

Filed Oct. 7, 1964 Sheet 2 of 4

Feb. 25, 1969 R. W. DOWNING ET AL 3,430,202

DATA PROCESSOR UTILIZING COMBINED ORDER INSTRUCTIONS

Filed Oct. 7, 1964 Sheet 3 of 4

FIG. 4

| 22 | 21 | 20 | 19 | 18 | 17 | 16 | ORDER |
|---|---|---|---|---|---|---|---|
| 0 | 0 | 0 | INDEX REGISTER | | DESTINATION REGISTER | | (UNMASKED) READ |
| 0 | 0 | 1 | INDEX REGISTER | | DESTINATION REGISTER | | (MASKED) READ |
| 0 | 1 | 0 | INDEX REGISTER | | SOURCE REGISTER | | WRITE |
| 0 | 1 | 1 | INDEX REGISTER | | — | | TRANSFER |
| 1 | 0 | 0 | INDEX REGISTER | | DESTINATION REGISTER | | (UNMASKED) REGISTER-TO-REGISTER |
| 1 | 0 | 1 | INDEX REGISTER | | DESTINATION REGISTER | | (MASKED) REGISTER-TO-REGISTER |
| 1 | 1 | 0 | DIRECTION | TYPE | REGISTER | | SHIFT<br>MAGNITUDE |
| | | | | | | | |
| 1 | 1 | 1 | INDEX REGISTER | | DESTINATION REGISTER | | (MASKED) READ-SHIFT |

United States Patent Office 3,430,202

Patented Feb. 25, 1969

3,430,202

DATA PROCESSOR UTILIZING COMBINED ORDER INSTRUCTIONS

Randall W. Downing, Eatontown, and Ronald J. Hass, New Shrewsbury, N.J., assignors to Bell Telephone Laboratories, Incorporated, New York, N.Y., a corporation of New York

Filed Oct. 7, 1964, Ser. No. 402,271

U.S. Cl. 340—172.5 24 Claims

Int. Cl. G11b *13/00*

ABSTRACT OF THE DISCLOSURE

We disclose a data processor in which a word may be read from memory, masked, stored in a register, and shifted in that register, all in accordance with a single instruction word. This is accomplished by limiting the shift to a simple shift to the right and examining the mask to determine the magnitude of the shift. This shift magnitude is determined by the position of the least significant "one" in the mask, so that the data will be arranged to have its first significant bit at the extreme right of the register.

Figure 1:
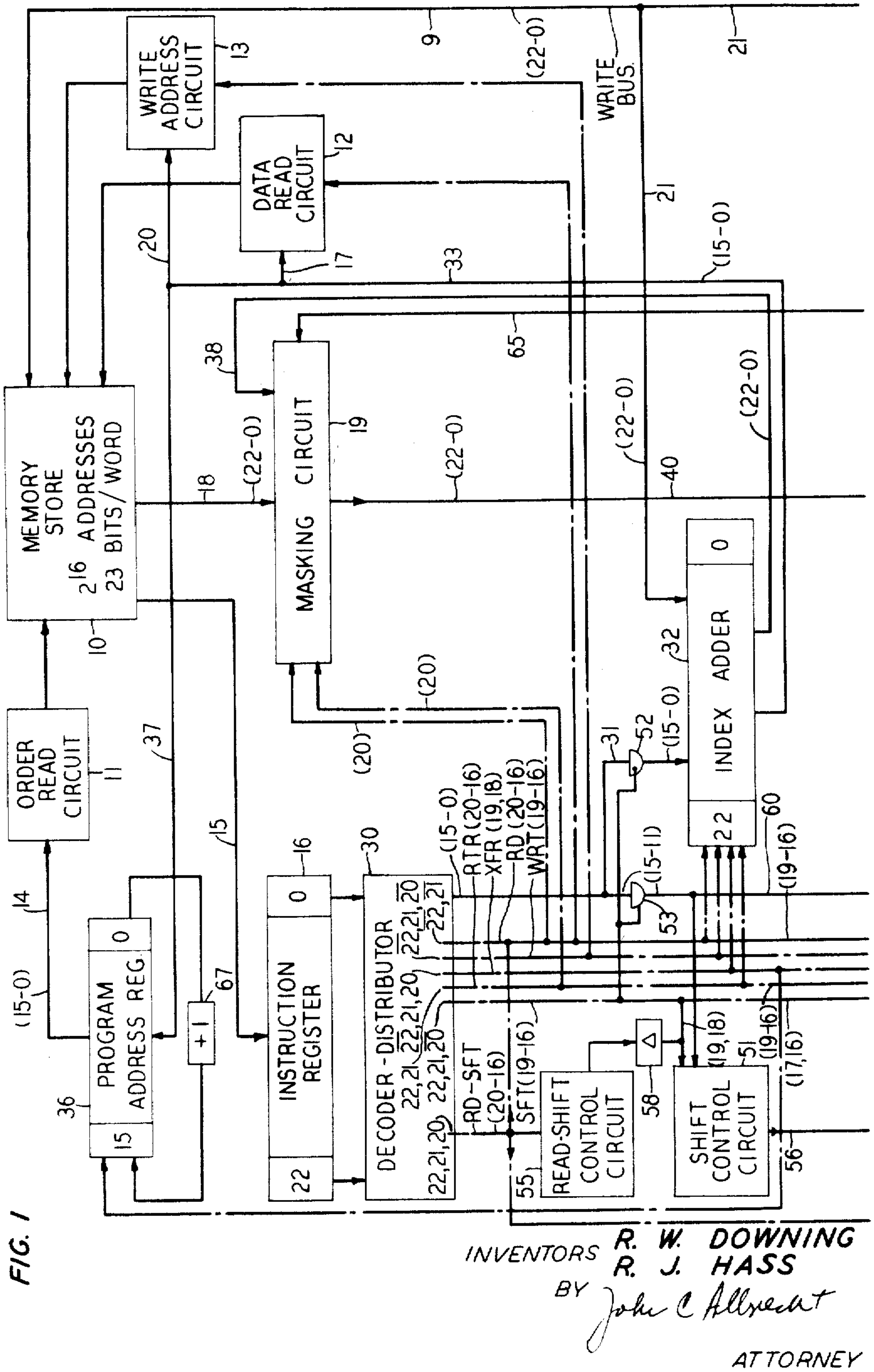

This invention relates to data processing equipment and more particularly to circuits for transferring data and operating on it under the control of a single instruction word.

In many data processing machines a product mask option is available on various types of orders. A mask blocks the transmission of selected bits in a word being transferred from one part of the machine to another. For example, the word 101011 might be transferred from a memory store to a register. In the course of the transfer, the word passes through a masking circuit. Suppose the mask in the masking circuit is the word 011110. Each bit in the mask is associated with a respective digit in the word. If the mask bit is a 1 the respective digit of the word is allowed to pass through the masking circuit to be written into the register. If the mask bit is a 0, a 0 is written into the respective bit position in the register. Thus, in the example selected, the only digits in the word which are passed through the masking circuit to the register are the four center digits 0101. The two outer digits in the word are blocked and 0's are substituted for them. Thus the final word appearing in the register after the masking operation is 001010. (Our invention is equally applicable to machines which provide an insertion mask option of the type described in Doblmaier et al. application Ser. No. 334,875, filed Dec. 31, 1963, the disclosure in which is hereby incorporated herein.)

In many data processing machines a shift order is also provided. The shift order controls the shifting of the bits in a specified one of the registers in the system. Often, a rotate as well as a shift order may be executed. In a rotate operation the bits shifted out of one of the ends of the register are reinserted in the other end. In a shift operation the bits shifted out of one of the ends of the register are not reinserted in the other end, and instead 0's are automatically written in the stages at the other end. (The term "shift order," unless clearly otherwise, is used throughout this description in a generic sense—it includes both shift and rotate orders.) A shift order, in addition to specifying the type of operation to be performed must specify a particular one of the system registers, the direction of the shift, i.e., left or right, and its magnitude.

In many systems very often it is necessary to follow a read order by a shift order. This is particularly true when the mask option is called for on the read order. Suppose, for example, that a particular data word represent a series of decimal digits, each decimal digit being written in the well-known binary coded decimal (BCD) form. The first four bits of the data word represent a first decimal digit, the second four represent a second decimal digit, etc. Suppose that in the execution of a subroutine the only bits in a data word which are required are those representing the second decimal digit. This digit is contained in the fifth through eighth bits of the data word. When the entire data word is read from the memory store into one of the system registers, it may be masked in the masking circuit by a mask of the form 000 . . . 0011110000. The resulting word stored in the register consists of all 0's except for the bits appearing in the fifth through eighth stages. These bits may be 0's or 1's depending on the values originally contained in the fifth through eighth bits of the data word.

After a read order of the type just described is performed it is often necessary to shift the word just stored in the register a number of positions such that the bits of concern appear in the least significant positions in the register. In the example selected it is necessary to shift the word stored in the register four positions to the right (the least significant digits always appearing on the right) in order that the four bits of concern will appear in the four least significant stages of the register. The reason that a shift order is often executed after a read order with a mask option is that the same subroutine may be used for analyzing each group of four bits in the original data word. The subroutine may include a series of instructions for operating on only the four least significant bits in the specified register. When the first four bits in the data word are operated upon the word may be read into the register through a mask which controls the writing of all 0's in the register except in the first four bits. Operations are then performed on those four bits in accordance with the particular subroutine. When it is necessary to operate on the second four bits in the original data word, the data word is read through another mask into the same register, the register now containing all 0's except in the fifth through eighth bits, whose values are the same as the values of the original fifth through eighth bits in the memory word. After the shift to the right of four positions the same subroutine may be utilized for operating on these bits. Similarly, the ninth through twelfth bits may be read through a third mask into the same register, and after shifting eight positions to the right the same subroutine may be used for operating on these bits. It is thus apparent that it is often advantageous to follow a masked read order with a shift order because the same subroutine may then be used for operating on any group of bits in the original memory word.

In prior art machines the execution of the masked read and shift orders have required two different instructions. In a typical machine in which only one instruction is executed in a single machine cycle, two machine cycles are required to execute the two orders. It has not been possible to provide a single instruction word which could control the execution of both orders. Even in machines in which all of the bits in an instruction word are not required to specify a read order, and all of the bits in an instruction word are not required to specify a shift order, the number of bits required to specify both orders exceeds the number of bits in a single instruction word. For these reasons it has generally been necessary in the prior art to provide two successive orders, i.e., two successive instructions, for controlling the sequential executions of masked read and shift operations.

It is a general object of this invention to provide a data processor in which read and shift orders are controlled by a single instruction word, both orders being specified by a number of bits fewer than the sum of the numbers of bits required to specify the two orders individually.

The invention is predicated on the observation that the magnitude of the shift required after a masked read order is executed can be determined from the mask itself. If the first 1 in the mask appears in the fifth position it is usually required to shift the masked word written into the register four positions to the right; since the first four bits in the mask are 0's the register contains 0's in its first four stages, and the bits of concern are in stages beginning with the fifth. For this reason the register word must be shifted four positions to the right. Since the shift magnitude may be determined from the mask itself it is not necessary for the instruction word utilized in our invention to carry this information. Nor is it necessary for the instruction word to carry the direction of the shift, or the register identity. The bits in the instruction word which control the masked read operation specify the register into which the masked word is written. The same bits may therefore identify the register whose contents are to be shifted. When the combined read-shift order of the invention is executed, the direction of the shift is always to the right and the type of shift operation, i.e., shift or rotate, is predetermined. The magnitude of the shift is controlled by the mask word itself. Thus when a machine is controlled in accordance with the principles of our invention a single instruction word may be used to specify a read operation followed by a shift operation because no additional bits are required in the instruction word to specify the shift order.

It is a feature of this invention to control in a data processor the executions of both read and shift orders in accordance with an instruction word carrying no more information than is ordinarily required to specify a read order alone.

It is another feature of this invention to provide means for determining the magnitude of the shift required on a read-shift order in accordance with the mask used during the read operation.

It is still another feature of this invention to shift the word read into one of the registers in a predetermined manner when a combined read-shift order is executed.

Figure 2:
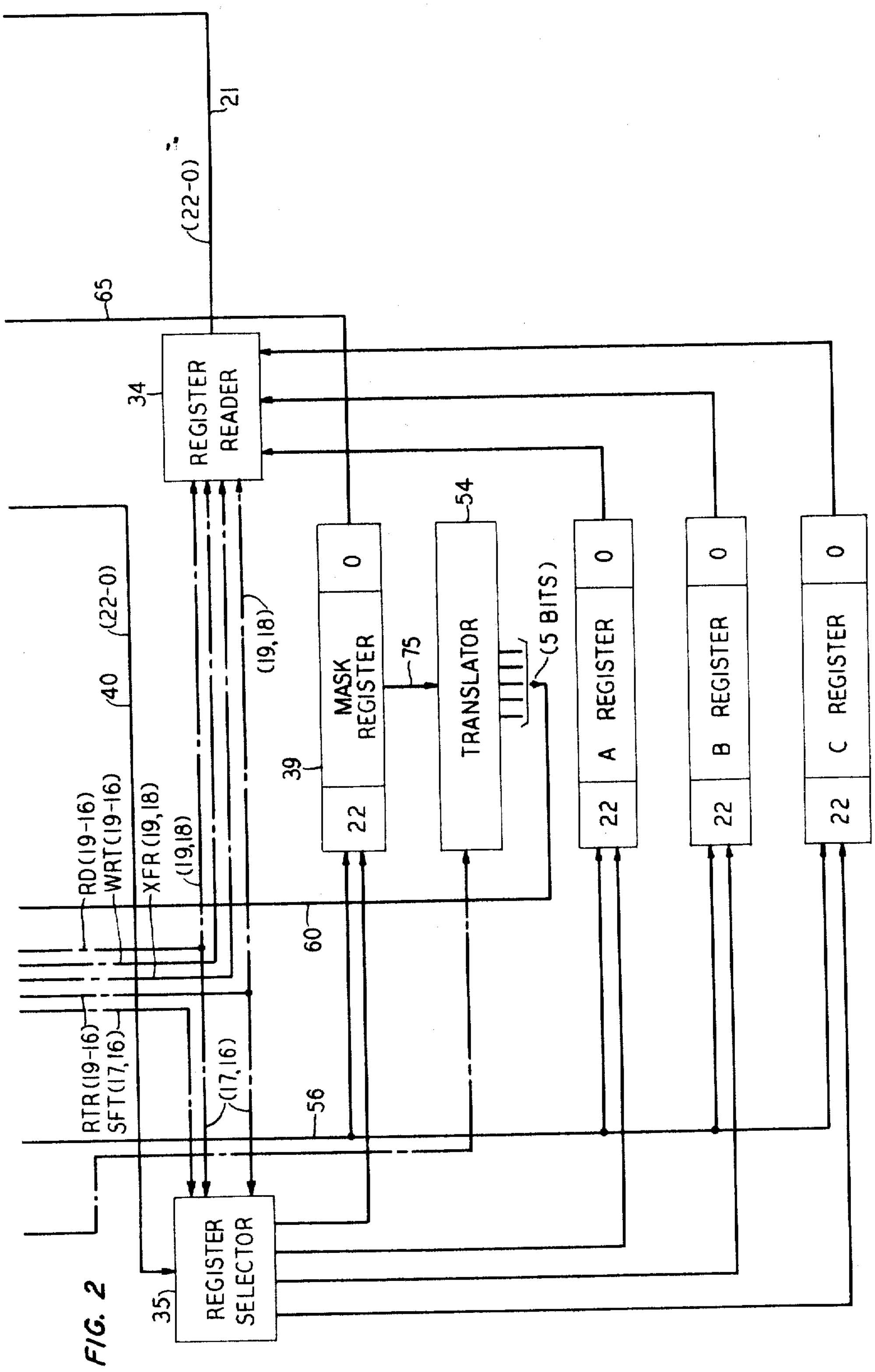
Figure 3:
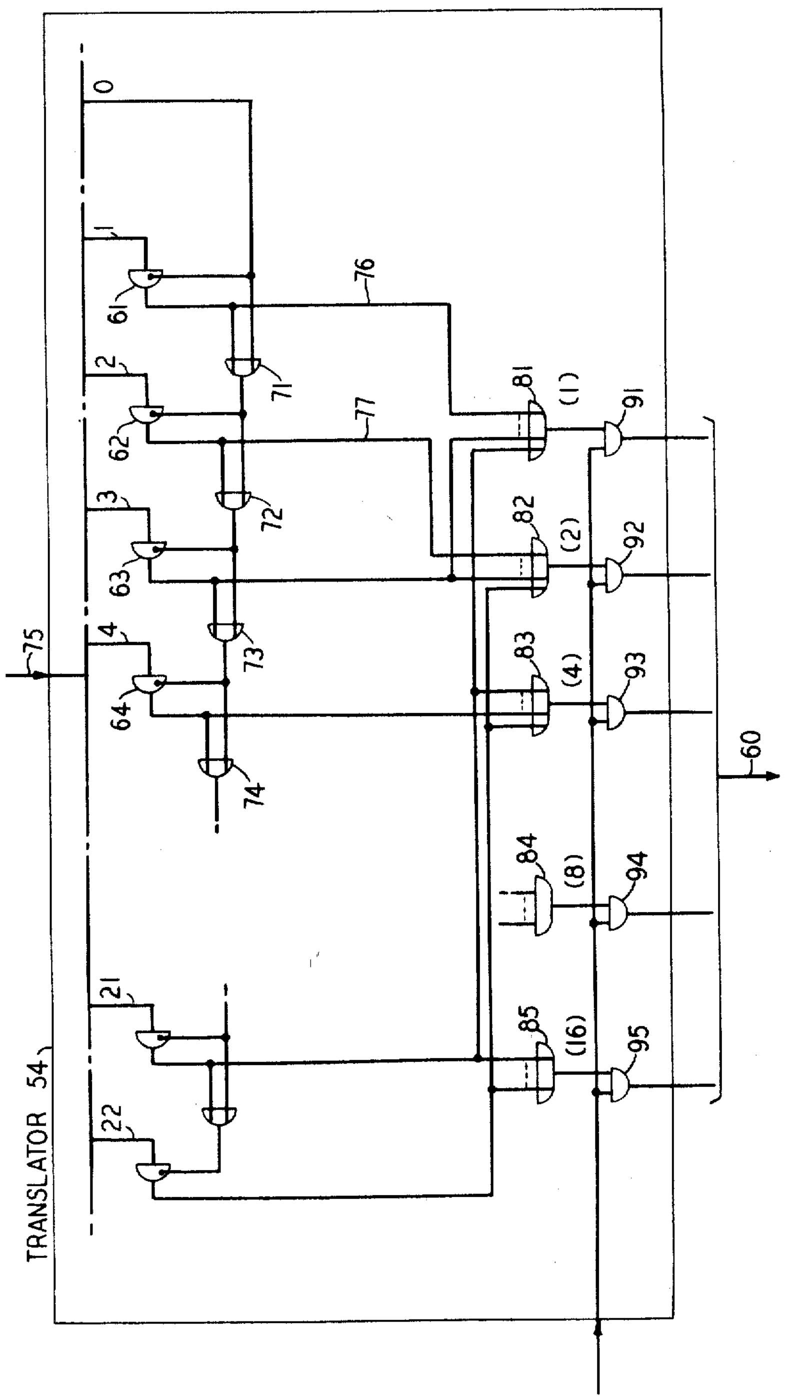

Further objects, features and advantages of the invention will become apparent upon consideration of the following description in conjunction with the drawing in which:

FIGS. 1 and 2 (with FIG. 1 being placed on top of FIG. 1) are a schematic representation of a data processor illustrative of one embodiment of our invention;

FIG. 3 is a detailed schematic of illustrative circuitry which may comprise the translator shown in FIG. 2; and FIG. 4 is a table indicating the coding of various orders in the illustrative data processor of the invention.

FIGS. 1 and 2 show one illustrative embodiment of our invention incorporated in a data processor depicted in simplified form. Thus, various elements of data processors well known in the art but not necessary for an understanding of our invention, such as timing circuitry, have been omitted. The timing scheme in the above-identified Doblmaier application, for example, may be incorporated in the illustrative data processor shown in the drawing. Further, as various of the functional blocks depicted perform known and recognized operations, the details of such circuitry have not been shown.

In the drawing and subsequent description the bits of the various words are numbered 15–0, 22–0, etc., with the more significant or higher order bit first.

Turning now to FIGS. 1 and 2 there will first be explained the normal operation of the data processor utilizing the individual orders and then the operation of the circuitry to utilize the combined read-shift order in accordance with our invention. In the illustrative embodiment of the invention all data words and all instruction words are 23 bits in length. Data words and instruction words are stored in memory store 10. The memory store has $2^{16}$ word locations. Accordingly, a particular word in the store is identified by a 16-bit address. The system includes three addressing circuits, order read circuit 11, data read circuit 12, and write address circuit 13. When an address is sent to the order read circuit on cable 14, the word in the respective location of the memory store is transmitted along cable 15 to instruction register 16. When an address is transmitted to data read circuit 12 on cable 17, the word in the respective memory location is transmitted from the memory store over cable 18 to masking circuit 19. When an address is sent to write address circuit 13 on cable 20, the word on write bus 9 is written into the respective memory location in memory store 10.

An instruction word appearing in instruction register 16 is decoded in decoder-distributor 30. The decoder-distributor applies bits 15–0 to cable 31 on all orders. Bits 15–0 comprise the constant in any instruction word. The system includes six order cables, RD, WRT, XFR, RTR, SFT and RD–SFT, each shown by a dotted line. The decoder-distributor applies various bits to one of these six order cables in accordance with the order coding shown in FIG. 4. The upper seven rows of FIG. 4 represent the coding of the five single orders which may be executed in the system. The last row represents the coding of the combined read-shift order of the invention. The five single orders will be described first, followed by the combined order of the invention.

Bits 22–16 are the bits which specify the order and the various registers which are to be used in its execution. The order itself is determined by either bits 22 and 21, or bits 22–20. The bits which determine the particular type of order to be executed are outlined in heavy lines in FIG. 4. Thus a read order is specified by the code 00 in bits 22 and 21. A write order is represented by the bits 010 in bits 22–20, and a transfer order is specified by the bits 011 in positions 22–20. A register-to-register order is represented by the code 10 in bits 22 and 21, and a shift order is executed when the combination 110 appears in bits 22–20. Only one of the five order cables is energized at any time, depending on the order to be executed.

The numbers in parentheses in FIGS. 1 and 2 represent the bits whose values are transmitted along the order cables. Certain of the cables which are not order cables also have numbers within parentheses associated with them. These numbers similarly indicate the bits which are transmitted along these cables. For example, bits 15–0 of the 23 bits in index adder 32 are transmitted along cable 33 to data read circuit 12 and write address circuit 13.

Some branches of the order cables are connected to various blocks of equipment which do not require specific bits for their operations. For example, order cable RD is connected to data read circuit 12 without any of bits 20–16 which appear on this cable being transmitted to the data read circuit. The reason for this is that when a read (RD) order is executed the data read circuit must operate. However, the data read circuit operates without requiring any particular bits contained in the instruction word. Thus when a read order is executed data read circuit 12 and index adder 32 both operate because they are enabled by order cable RD. The five bits which appear on the order cable are directed to masking circuit 19, register reader 34 and register selector 35 as shown in FIGS. 1 and 2. These three units require, in addition to an enabling signal, specific bit values for their proper operations.

Before the five individual orders which may be executed are considered, certain remarks might be made concerning the individual units in the system. The particular instruction word which is placed in instruction register 16 is controlled by program address register 36. This register contains 16 stages and the binary number in it specifies the address of the next instruction. The program address register successively applies 16-bit addresses to cable 14, connected to order read circuit 11. The instruction words in the respective memory locations in store 10 are successively transmitted to instruction register 16 via cable 15. The address in program address register 36 is continuously incremented by increment circuit 67. The instruction words which are transmitted to instruction register 16 are derived from successively addressed memory locations. However, it is possible to transfer to an instruction word which is not in sequence. When a 16-bit word appears on cable 37 and order cable XFR enables the program address register, the 16-bit word on cable 37 is stored in the program address register. This address is then transmitted via cable 14 to order read circuit 11, and it is this address in the program address register which is now incremented to derive the addresses of succeeding instructions.

Register reader 34 is enabled on four orders, and reads the 23-bit word stored in one of the A, B and C registers. Bits 22–0 are transmitted along cable 21 to index adder 32, and along write bus 9 to memory store 10. If an address has been sent along cable 20 to write address circuit 13 the 23-bit word on the write bus is written into the memory store. If instead index adder 32 is enabled, the 23-bit word is added in the index adder to the 16 bits in the constant of the instruction word appearing on cable 31. The full 23-bit sum derived by the index adder is applied to cable 38 if the index adder is enabled by the RTR order cable as described below. If the index adder is enabled by one of the RD, XFR or WRT order cables, instead of the full 23-bit word being applied to cable 38, only the first 16 bits of it are applied to cable 33.

A 23-bit word is delivered to masking circuit 19 via either cable 18 or cable 38. If bit 20 is a 1 on either a read (RD) order or a register-to-register (RTR) order, the 23-bit word delivered to the masking circuit is masked by the mask word contained in masking register 39. The resulting masked word apears on cable 40 and is delivered to register selector 35. If bit 20 in the order being executed is a 0, indicating that the mask option is not required, the 23-bit word on either cable 18 or 38 is transmitted directly through the masking circuit to the register selector. The register selector directs the word on cable 40 to either the mask register or one of the A, B and C registers, depending on the values of bits 17 and 16 on the read order cable or the register-to-register order cable.

The operation of the data processor may be best understood by considering each of the five possible orders separately. As shown in FIG. 4 a read order is specified when bits 22 and 21 are both 0's. This is shown symbolically by the representation $\overline{22}$, $\overline{21}$ within decoder-distributor 30. When both bits 22 and 21 are 0's bits $\overline{22}$ and $\overline{21}$ are both 1's, and order cable RD is energized. Bits 20–16 are transmitted along the order cable to the various units requiring them. Bit 20 is sent to masking circuit 19 and as shown in FIG. 4 controls the masking operation only if it is a 1. Bits 19 and 18 are delivered to register reader 34. These two bits specify one of four registers, the mask register or register A, B or C. There is no connection from the mask register to the register reader, and accordingly if the mask register is specified by bits 19 and 18 the register reader does not operate. If one of registers A, B or C is specified its contents are delivered via cable 21 to index adder 32. The index adder is enabled by the RD order cable and adds the 23-bit word from the specified register to the 16-bit constant in the instruction word which appears on cable 31 on four of the five orders. Normally enabled gate 52 is inhibited from operating only when a shift order is executed. When one of the other four orders is executed gate 52 is enabled and transmits the 16-bit constant of the instruction word to the index adder. A 23-bit sum is thus derived in the index adder during this "indexing" step. However, only the first 16 bits of this sum are delivered to cable 33 by the index adder. When the index adder is enabled by the read order cable the index adder does not transmit its contents to the masking circuit via cable 38.

The 16-bit word on cables 33 and 37 has no effect on program address register 36 because this unit is not enabled when a read order is executed. The same 16-bit word on cable 20 similarly has no effect on write address circuit 13 because this unit is also not enabled when a read order is executed. However, data read circuit 12 is enabled by the read order cable. Data read circuit 12 controls the reading of the word from the location in memory store 10 represented by the 16-bit address on cables 33 and 17, and the transmission of the word via cable 18 to the masking circuit. If bit 20 is a 1 the word is masked by the contents of mask register 39 and the resulting masked word appears on cable 40. If bit 20 on the read order cable is a 0 the word is not masked and the full word in the specified address appears on cable 40. Register selector 35 then directs the word to either the mask register or one of the A, B and C registers. Which of these four registers is selected depends on the values of bits 17 and 16 which are transmitted along the read order cable to the register selector.

It will be noted that in FIG. 4 bits 19 and 18 in the instruction word identify an "index register." These bits actually identify register A, B or C, or the masking register if the register reader is not to operate. The label "index register" is used because the contents of the specified register are delivered to the index adder to be added to the constant of the instruction word during the indexing step. Bits 17 and 16 are labeled "destination register" because these bits identify that one of the four registers which is the destination of the word read from the memory store.

Whenever the mask option is required on either a read order or, as will be seen below, a register-to-register order, it is first necessary to execute another read order. The mask which is used in the execution of the subsequent order must first be stored in the mask register. A read order is required to read the mask from store 10 into the mask register. The instruction word would include 0's in bits 22 and 21 to identify the read order. Bit 20 would also be a 0 because if the complete mask word is in the store it should not be masked when reading it into the register selector. Bits 17 and 16 would control the register selector to direct the mask to the mask register. Bits 19 and 18 would identify that one of registers A, B and C whose contents when added to the constant of the instruction word would result in the address of the location in the store which contains the mask word.

It should be noted that the execution of a read order has been described without reference to the particular times of operation of the various units involved. Only relative times of operation have been described. For example, register reader 34 operates prior to register selector 35. The timing of the various units in the system may be controlled as described in the above-identified Doblmaier et al. application. The drawing has also been simplified in other respects to show only those units required for an understanding of the invention. For example, memory store 10 may include input/output equipment such as that described in W. Ulrich application, Ser. No. 402,090 filed Oct. 7, 1964. Similarly, most systems are capable of executing more than five basic individual orders. However, for an understanding of the invention it is sufficient to show a simplified system with only the elements required for practicing the invention shown in greater detail.

Referring to FIG. 4 it is seen that the second order, a write order, is executed when bits 22–20 contain the code 010. Order cable WRT is energized at this time. This is shown symbolically by the expression $\overline{22}$, 21, $\overline{20}$ within decoder-distributor 30. It should be noted that the mask option is not available on write orders. Bit 20 which controls the operation of masking circuit 19 on read and register-to-register orders is used instead to distinguish between write and transfer orders, the mask option not being available on either of these two orders. The bits which appear on order cable WRT are 19–16.

On a write order, register reader 34 operates twice in succession. First, bits 19 and 18 direct the register reader to read out the contents of one of registers A, B and C. The 23-bit word is directed to both index adder 32 and memory store 10. The word directed to memory store 10 on write bus 9 has no effect on this circuit because write address circuit 13 is not enabled at this time. It is true that the WRT order cable enables this circuit when a write order is executed, but the write address circuit is not enabled until register reader 34 operates a second time during the execution of the order. Index adder 32 is enabled at this time however, and the word read by register reader 34 is added to the constant of the instruction word. Only the first 16 bits of the sum are directed to cable 33. The full 23-bit word derived in the index adder is not directed to cable 38 when the index adder is enabled by order cable WRT. The 16 bits on cable 37 have no effect on program address register 36 which is not enabled during the execution of a write order. Similarly, data read circuit 12 is not affected because it is not enabled by order cable WRT. The 16-bit word on cable 20 however is stored in write address circuit 13. This circuit is enabled by order cable WRT at a time during the execution of a write order after index adder 32 has completed its operation. The 16 bits stored in write address circuit 13 represent the address in the memory store into which the word next to be derived is written.

Register reader 34 then operates a second time, and reads out the 23-bit word in the particular one of the A, B and C registers represented by bits 17 and 16. The 23-bit word is directed again to both memory store 10 and index adder 32. The index adder is not enabled at this time however by order cable WRT, the index adder being enabled only during the first operation of register reader 34. The 23-bit word on write bus 9 is written into memory store 10 at the location specified by the address stored in write address circuit 13.

As seen in FIG. 4 on a write order bits 19 and 18 specify an "index register," and bits 17 and 18 specify a "source register." The contents of the index register specified is first added to the constant (bits 15–0) of the instruction word to determine the address in the memory store into which the word is to be written. Bits 17 and 16 are then used to identify the register which is the source of the 23-bit word to be written into the memory store in the location previously determined. Bits 19 and 18 may specify mask register 39 in which case register 34 does not operate, and the address transmitted to write address circuit 13 via cables 33 and 20 is merely the constant of the instruction word. Bits 17 and 16 may specify only one of registers A, B and C. Mask register 39 may not be identified by bits 17 and 16 on a write order because, if they are, register reader 34 does not operate and no bits appear on the write bus to be written into the memory store at the previously determined address.

The third order, a transfer, is represented by the sequence 011 in bits 22–20 of the instruction word. Again, the masked option is not available on a transfer order and bit 20 is used to distinguish between write and transfer orders. Bits 19 and 18 specify an index register, and bits 17 and 18 are not used. Order cable XFR is enabled and bits 19 and 18 are transmitted along the cable to register reader 34. These bits may specify mask register 39, in which case register reader 34 does not operate, or one of the A, B and C registers. The 23-bit word on cable 21 is directed to both memory store 10 and index adder 32. Write address circuit 13 is not enabled on a transfer order and the bits on the write bus have no effect on the memory store. The index adder is enabled however and the word read by register reader 34 is added to the constant of the instruction word in the index adder. The sum is not applied to cable 38, and instead only the first 16 bits of it are applied to cable 33. The bits on cable 33 have no effect on either data read circuit 12 or write address circuit 13 which are not enabled when a transfer order is executed. However, the 16 bits on cables 33 and 37 are written into program address register 36 which is enabled when a transfer order is executed. These 16 bits are directed along cable 14 to order read circuit 11, and the next instruction word transmitted from memory store 10 to instruction register 16 via cable 15 is determined by this 16-bit address. The address is stored in program address register 36, and it is this address which is incremented to derive subsequent addresses for instruction words until another transfer order is executed. The instruction word controlling a transfer order has no bits contained in positions 17 and 16, these positions normally identifying either a destination register or a source register. A destination register must be identified when information is to be written into either the mask register or one of registers A, B and C. A source register must be identified on a write order when the word in one of registers A, B and C is to be written into memory store 10. Neither of these situations exists when a transfer order is executetd. Only bits 19 and 18 are required; they specify an index register. Indexing, in general, is the process of modifying (by adding) the constant of an instruction word with data previously stored in one of registers A, B and C. Indexing is available on all orders (except the shift order) and if it is not required bits 19 and 18 merely specify the mask register in which case register reader 34 does not operate.

The fourth type of order which may be executed in the system is a register-to-register order. The order is identified by the code 10 in bits 22 and 21. As in the read order the mask option is available and is controlled by the value of bit 20. Register reader 34 reads the 23 bits in the register specified by bits 19 and 18. The word is directed to the index adder where it is added to the constant of the instruction word. When a register-to-register order is executed, order cable RTR controls index adder 32 to supply the 23-bit sum on cable 38, rather than the first 16 bits of the sum on cable 33. The 23-bit sum passes through masking circuit 19 and is masked by the contents of mask register 39 only if the value of bit 20 in the instruction word is a 1. The output of masking circuit 19 is directed to register selector 35 which then directs the word into either mask register 39 or one of registers A, B and C, depending upon the values of bits 17 and 16 which in a register-to-register order specify a destination register. The purpose of the register-to-register order is to allow the transfer of the 23-bit word stored in register A, B or C to either mask register 39, or one of registers A, B and C. In the course of the transfer the word may be modified in one of two ways. The original contents of the index register may be modified if the constant of the instruction word is anything other than the number zero. Also, the original contents of the index register may be modified if the mask option is ordered.

It should be noted that if bits 19 and 18 specify mask register 39 the word transmitted to the masking circuit via cable 38 is merely the 16-bit constant of the instruction word. Ordinarily a 23-bit word is transmitted via cable 38 to the masking circuit, but if bits 19 and 18 specify the mask register the register reader does not operate, and only the 16 bits in the constant part of the instruction word are transmitted through the index adder and masking circuit to the specified destination register. These 16 bits may be masked by the contents of the first 16 bits of mask register 39, if the mask operation is ordered, to derive a 23-bit word. If masking is not ordered only a 16-bit word appears on cable 40 to be stored in either mask register 39, or one of registers A, B and C. The seven most significant bits in the register remain unchanged.

The fifth order which may be executed in the system is a shift. When the code 110 appears in bits 22–20 of the instruction register order cable SFT is energized. When a shift order is executed the indexing step is not required. For this reason index adder 32 is not enabled by order cable SFT. The energization of the order cable inhibits gate 52 and enables gate 53. Bits 15–0 in the constant of the instruction word are no longer transmitted to the index adder through gate 52. Instead bits 15–11 are transmitted through gate 53 to shift control circuit 51. These five bits represent, in binary, the magnitude of the shift required. (While bits 15–0 of an instruction word ordinarily represent a constant, as seen in FIG. 4 when a shift order is executed five of these bits represent control information; the remainder of the constant is not used.)

Bits 17 and 16 on order cable SFT are transmitted to register selector 35. When the same bits are transmitted to the register selector when either a read or a register-to-register order is executed, the register selector controls the writing of the word on cable 40 into the respective register. When order cable SFT is energized however, although the register selector enables one of the four registers, no word is transmitted on cable 40 to be written into the register. One of the four registers is merely enabled, and instead of a word being transmitted through the register selector to this register, the word already in the register is shifted in accordance with the output signals of shift control circuit 51 on cable 56.

As seen in FIG. 4 bit 19 is transmitted to shift control circuit 51 and notifies this circuit whether the direction of the shift is to the left or right. Bit 18 is also transmitted to the shift control circuit and notifies the circuit of the type of operation to be performed, i.e., shift or rotate. Bits 15–11 in the contsant of the instruction word specify the magnitude of the shift. The appropriate control signals are applied to cable 56 and are extended to the four registers. However, the shift operation takes place in only that register enabled by register selector 35.

As described above it is often necessary to read a word from the memory store, mask it, and store it in one of the four registers in the system, after which the word in the register must be shifted to the right. Two instruction words are ordinarily required to control the execution of these two orders. The reason for this is that the 23 bits of an instruction word are insufficient in number to represent both a read order and a shift order. The masked read order requires all 23 bits in the instruction word, and the shift order requires 12 bits. A 35-bit instruction word would thus be required to specify both orders. Since instruction words contain only 23 bits two successive orders are required. In accordance with our invention, however, a combined read-shift order is controlled by a single instruction word. The combined order is executed when order cable RD–SFT is energized.

When the code 111 appears in bits 22–20 of the instruction word in register 16 order cable RD–SFT is energized. Bits 20–16 appear in this cable. This order cable is tied to order cable RD. Bits 20–16 control a masked read operation in the ordinary manner. Gate 52 is enabled and indexing takes place as usual. An address is transmitted to the memory store and a word is read from the store through the masking circuit to the register selector. Bit 20 is a 1 and controls mask circuit 19 to mask the word read in accordance with the mask word in register 39. Bits 17 and 16 control register selector 35 to direct the masked word to one of the four registers.

Order cable RD–SFT also enables translator 54, and read-shift control circuit 55. Translator 54 examines the mask register 39, and applies bit values on its five output conductors which represent, in binary, the number positions which the word just read into one of the registers is to be shifted. For example, if bit 4 in the mask is the first to contain a 1, the output of translator 54 is 00100. The five output conductors of the translator are tied by cable 60 to the five input conductors of shift control circuit 51 whose bit values represent the magnitude of the shift required. Read-shift control circuit 55 has two output conductors which are tied to the two input conductors of shift control circuit 51 which represent the direction and type of shifting required (bits 19 and 18 in a shift order). The two bits transmitted by read-shift control circuit 55 to shift control circuit 51 always represent a shift operation and the right direction. These two bits are transmitted through delay circuit 58 in order that shift control circuit 51 not operate until after the word read from the memory store is stored in the register specified by bits 17 and 16. This shift control circuit 51 is notified of the type of shifting required (shift as contrasted with rotate), the direction (right), and the magnitude of the shift. The command signals applied to cable 56 are directed to the four registers. However, only one of these registers has been enabled by register selector 35, namely, the register into which the word just read has been written. This word is then shifted as required.

Referring to FIG. 4 it will be noted that except for the order code 111 the various bits in the read-shift instruction word represent precisely what they do in a masked read order. The instruction word itself carries no additional information. The new order code however energizes a new order cable which automatically controls the shifting of the word which is read into one of the registers. No shift information need be carried in the instruction word itself. The direction and type of shifting is always the same when the combined read-shift order is executed. The particular register is specified by bits 17 and 16, since the register whose contents are to be shifted is the same register into which a word has just been written. Finally, the magnitude of the shift is also not required in the instruction word because it is determined by the mask itself, stored in mask register 39.

A particular translator which may be used in the data processor FIGS. 1 and 2 is shown in detail in FIG. 3. The 23 bits in the mask register appear in cable 75 connected to translator 54, one bit on each conductor. Except for the conductor carrying bit 0, each is connected to the input of a normally enabled gate such as gates 61 and 62. The operation of the circuit may be best understood by considering a specific example. Consider that the mask stored in register 39 is the word 00 . . . 111100. Positive potentials represent 1's and negative potentials represent 0's. The first bit (bit 0) in the mask is a 0 and a negative potential appears at the control terminal of gate 61. Accordingly, this gate remains enabled, and the value of bit 1 in the mask is transmitted through it to gate 71 and to conductor 76. Bit 1 is also a 0 and the negative potential on conductor 76 does not operate OR gate 81. Negative potentials appear on both inputs of OR gate 71 whose output is therefore also negative. (Each of the OR gates provides a negative output unless at least one of the inputs is positive.) Gate 62 is enabled since OR gate 71 is unoperated, and bit 2 is transmitted through this gate to conductor 77 and to one of the inputs of OR gate 72. Bit 2 is a 1 and the positive potential on conductor 77 operates OR gate 82. In addition, the positive potential at the input of OR gate 72 operates this gate. The positive potential at the output of OR gate 72 inhibits the operation of gate 63, and instead controls the operation of gate 73. Gate 73 in turn controls the operation of gate 74. All of the OR gates associated with bits 2–21 operate and inhibit the respective control gates from transmitting the remaining bits in the mask word to OR gates 81–85. A positive potential appears on conductor 77 and only OR gate 82 of gates 81–85 operates. The output of OR gate 82 has a binary value of 2. The output of this gate is connected to one of the inputs of AND gate 92. The energizing signal on order cable RD–SFT is applied to one of the inputs of each of gates 91–95. Only gate 92 operates because only the OR gate associated with this gate has been operated. The output of gate 92 is high and the outputs of gates 91 and 93–95 are low. Accordingly, the binary value 00010 is transmitted to shift control circuit 51 over cable 60 to control the shifting of the word in the specified register by two positions. (The energizing pulse transmitted on order cable RD–SFT to translator 54 is short in duration. The original contents of the mask register determine the output of the translator. Even if the word read from the memory store is written into the mask register itself, it is the original mask in the register which controls the output of the translator. By the time the new word is written into the mask register the pulse on order cable RD–SFT extended to translator 54 has terminated. The number 00010, already transmitted to shift control circuit 51, controls this circuit to shift the word just stored in the mask register as soon as the two bits from read-shift control circuit 55 are transmitted through delay circuit 58.)

As another example consider that the mask contained in register 39 is 00 . . . 111110000. The outputs of all of gates 61–63 are low and none of OR gates 71–73 is energized. The output of gate 64 is high, and OR gate 74 and all OR gates associated with more significant bits are energized. Accordingly, control gates associated with bits 22–5 are inhibited from operating. The only control gate with a positive output is gate 64. The output of gate 64 is connected to one of the inputs of OR gate 83, and when the energizing pulse on order cable RD–SFT is applied to the translator the binary number 00100 is transmitted to shift control circuit 51.

Some of the control gate output conductors are connected to more than one OR gate. For example, the output of the control gate associated with bit 21 is connected to an input of each of OR gates 85, 83 and 81, and when the first bit in the mask to contain a 1 is bit 21, the binary number 10101 is transmitted to shift control circuit 51. It will be noted that the conductor carrying bit 0 of the mask is not connected to any of the OR gates 81–85. If the first bit in the mask is a 1 the word just stored in the register should not be shifted. OR gate 71 and all similar higher numbered OR gates are operated, and none of the control gates similar to gate 61 and none of OR gates 81–85 are operated. In fact, if the first bit in the mask is a 1 it is not necessary to even use the read-shift order in the first place, the ordinary read order being sufficient because a shift operation is not required. The scheme of the translator is apparent. The first bit in the mask which is a 1 inhibits all higher numbered control gates from operating, and the higher numbered bits, even if they are 1's, cannot control the operation of OR gates 81–85. These OR gates are similarly not controlled by bits of lesser significance because these bits are all 0's.

It is to be understood that the above-described arrangement is merely illustrative of the principles of the invention. For example, another operation code may be provided to control the execution of both read and shift orders even if masking is not required. The shift order may be combined with orders other than read, e.g., register-to-register. In machines having an instruction word length greater than a data word length it may be possible to carry the mask to be used in the instruction word itself, to first set up the mask register, and to then perform the required data processing operation using the previously set up mask and the shift control information derived from it. Thus numerous modifications may be made in the illustrative embodiment and other arrangements may be devised without departing from the spirit and scope of the invention.

What is claimed is:

1. A data processor comprising
a memory store,
a plurality of registers,
an order distributor,
means for transmitting successively stored instruction words from said memory to said order distributor, each of said instruction words including an order part and a constant part,
an index adder,
means for normally transmitting the constant part of the instruction word contained in said order distributor to said index adder,
means responsive to the order part of the instruction word contained in said order distributor for transmitting to said index adder the data word contained in one of said registers, said index adder deriving the sum of said constant part and said register data,
means responsive to a first order part of an instruction word being contained in said order distributor for reading into one of said registers the data stored in the memory location represented by said index adder sum,
a mask register,
a masking circuit,
means responsive to said first order part being contained in said order distributor for controlling said masking circuit to mask the data read from said memory store into said one of said registers by the mask contained in said mask register,
means responsive to a second order part of an instruction word being contained in said order distributor for writing the data in one of said registers into the memory location represented by said index adder sum,
means responsive to a third order part of an instruction word being contained in said order distributor for controlling said transmitting means to transmit successively stored instruction words from said memory to said order distributor beginning with the instruction word stored in the location represented by said index adder sum,
means responsive to a fourth order part of an instruction word being contained in said order distributor for storing said index adder sum in one of said registers and for controlling said masking circuit to mask said index adder sum by the mask contained in said mask register,
means responsive to a fifth order part of an instruction word being contained in said order distributor for inhibiting the operation of said normally transmitting means,
means for shifting the data in one of said registers in the manner represented by said fifth order part in said order distributor and by the magnitude represented by a portion of the constant part of the same instruction word,
a translator connected to said mask register for deriving a shift magnitude in accordance with the position in said mask register containing the least significant bit having a predetermined value,
means responsive to a sixth order part being contained in said order distributor for controlling the operation of said reading means and for controlling the transmission of the shift magnitude derived by said translator to said shifting means,
and means responsive to said sixth order part being contained in said order distributor for controlling said shiifting means to shift the data read into one of said registers by said reading means in a predetermined manner and in accordance with the magnitude derived by said translator.

2. A data processor in accordance with claim 1 further including means for delaying the operation of said shifting means responsive to said sixth order part being contained in said order distributor until after said reading means has operated.

3. A data processor comprising
a memory store,
a plurality of registers,
an order distributor,
means for transmitting successively stored instruction words from said memory store to said order distributor, each of said instruction words including an order part and a constant part,
an index adder,
means for normally transmitting the constant part of the instruction word contained in said order distributor to said index adder,
means responsive to the order part of the instruction word contained in said order distributor for transmitting to said index adder the data contained in one of said registers, said index adder deriving the sum of said constant part and said register data,
a mask register,
a masking circuit,
means responsive to a first order part of an instruction word being contained in said order distributor for transferring data within said data processor in accordance with the sum derived by said index adder and for controlling said masking circuit to mask said transferred data by the mask contained in said mask register,
means responsive to a second order part of an instruction word being contained in said order distributor for inhibiting the operation of said normally transmitting means,
means for shifting the data in one of said registers in the manner represented by said second order part in said order distributor and by the magnitude represented by a portion of the constant part of the same instruction word,
a translator connected to said mask register for deriving a shift magnitude in accordance with the position in said mask register containing the least significant bit having a predetermined value,
means responsive to a third order part being contained in said order distributor for controlling the operation of said transferring means and for controlling the transmission of the shift magnitude derived by said translator to said shifting means,
and means responsive to said third order part being contained in said order distributor for controlling said shifting means to shift the data in one of said registers in a predetermined manner and in accordance with the magnitude derived by said translator.

4. A data processor comprising
a memory store,
a plurality of registers,
an order distributor,
means for transmitting successively stored instructions from said memory store to said order distributor, each of said instructions including an order part and a constant part,
a mask register,
a masking circuit,
means responsive to a first order part of an instruction being contained in said order distrbutor for transferring a word within said data process or in accordance with the instruction contained in said order distributor and for controlling said masking circuit to mask said transferred word by the mask contained in said mask register, means responsive to a second order part being contained in said order distributor for shifting the word in one of said registers in the manner represented by said second order part and by the magnitude represented by a portion of the constant part of the same instruction,
a translator connected to said mask register for deriving a shift magnitude in accordance with the position in said mask register containing the least significant bit having a predetermined value,
means responsive to a third order part being contained in said order distributor for controlling the operation of said transferring means and for controlling the transmission of the shift magnitude derived by said translator to said shifting means,
and means responsive to said third order part being contained in said order distributor for controlling said shifting means to shift the word in one of said registers in a predetermined manner and in accordance with the magnitude derived by said translator.

5. A data procesor comprising
a memory store,
a plurality of registers,
an order distributor,
means for transmitting successively stored instruction words from said memory store to said order distributor, each of said instruction words including an order part and a constant part,
an index adder,
means for normally transmitting the constant part of of the instruction word contained in said order distributor to said index adder,
means responsive to the order part of the instruction word contained in said order distributor for transmitting to said index adder the data contained in one of said registers, said index adder deriving the sum of said constant part and said register data,
means responsive to a first order part of an instruction word being contained in said order distributor for transferring data within said data processor in accordance with the sum derived by said index adder,
means responsive to a second order part of an instruction word being contained in said order distributor for inhibiting the operation of said normally transmitting means,
means for shifting the data in one of said registers in the manner represented by said second order part in said order distributor and by the magnitude represented by a portion of the constant part of the same instruction word,
a translator connected to a predetermined one of said registers for deriving a shift magnitude in accordance with the position in said predetermined register containing the least significant bit having a predetermined value,
means responsive to a third order part being contained in said order distributor for controlling the operation of said transferring means and for controlling the transmission of the shift magnitude derived by said translator to said shifting means,
and means responsive to said third order part being contained in said order distributor for controlling and shifting means to shift the data in one of said registers in a predetermined manner and in accordance with the magnitude derived by said translator.

6. A data processor comprising
a memory store,
a plurality of registers,
an order distributor,
means for transmitting successively stored instruction words from said memory store to said order distributor, each of said instruction words including an order part and a constant part,
means responsive to a first order part of an instruction word being contained in said order distributor for transferring data within said data processor in accordance with the instruction word contained in said order distributor, means responsive to a second order part being contained in said order distributor for shifting the data in one of said registers in the manner represented by said second order part and by the magnitude represented by a portion of the constant part of the same instruction word, a translator connected to a predetermined one of said registers for deriving a shift magnitude in accordance with the position in said predetermined register containing the least significant bit having a predetermined value, means responsive to a third order part being contained in said order distributor for controlling the operation of said transferring means and for controlling the transmission of the shift magnitude derived by said translator to said shifting means, and means responsive to said third order part being contained in said order distributor for controlling said shifting means to shift the data in one of said registers in a predetermined manner and in accordance with the magnitude derived by said translator.

7. A data processor comprising a memory store, a plurality of registers, an order distributor, means for transmitting successively stored instructions from said memory store to said order distributor, each of said instructions including an order part and a constant part, an index adder, means for normally transmitting the constant part of the instruction contained in said order distributor to said index adder, means responsive to the order part of the instruction contained in said order distributor for transmitting to said index adder the data word contained in one of said registers, said index adder deriving the sum of said constant part and said register data word, a mask register, a masking circuit, means responsive to a first order part of an instruction being contained in said order distributor for transferring a data word within said data processor in accordance with the sum derived by said index adder and for controlling said masking circuit to mask said transferred data word by the mask contained in said mask register, means responsive to a second order part of an instruction being contained in said order distributor for inhibiting the operation of said normally transmitting means, means for performing a logical operation on the data word in one of said registers in accordance with said second order part in said order distributor and in accordance with the constant part of the same instruction, a translator connected to said mask register for deriving a control signal in accordance with the position in said mask register containing the least significant bit having a predetermined value, means responsive to third order part being contained in said order distributor for controlling the operation of said transferring means and for controlling the transmission of the control signal derived by said translator to said logical operating means, and means responsive to said third order part being contained in said order distributor for controlling said logical operating means to operate on the data word in one of said registers in a predetermined manner and in accordance with the control signal derived by said translator.

8. A data processor comprising a memory store, a plurality of registers, an order distributor, means for transmitting successively stored instruction words from said memory store to said order distributor, each of said instruction words including an order part and a constant part, a mask register, a masking circuit, means responsive to a first order part of an instruction word being contained in said order distributor for transferring data within said data processor in accordance with the instruction word contained in said order distributor and for controlling said masking circuit to mask said transferred data by the mask contained in said mask register, means responsive to a second order part being contained in said order distributor for performing a logical operation on the data in one of said registers in accordance with said second order part and in accordance with the constant part of the same instruction word, a translator connected to said mask register for deriving a control signal in accordance with the position in said mask register containing the least significant bit having a predetermined value, means responsive to a third order part being contained in said order distributor for controlling the operation of said transferring means and for controlling the transmission of the control signal derived by said translator to said logical operating means, and means responsive to said third order part being contained in said order distributor for controlling said logical operating means to operate on the data in one of said registers in a predetermined manner and in accordance with the control signal derived by said translator.

9. A data processor comprising a memory store, a plurality of registers, an order distributor, means for transmitting successively stored instruction words from said memory store to said order distributor, each of said instruction words words including an order part and a constant part, an index adder, means for normally transmitting the constant part of the instruction word contained in said order distributor to said index adder, means responsive to the order part of the instruction word contained in said order distributor for transmitting to said index adder the data contained in one of said registers, said index adder deriving the sum of said constant part and said register data, means responsive to a first order part of an instruction word being contained in said order distributor for transferring data within said data processor in accordance with the sum derived by said index adder, means responsive to a second order part of an instruction word being contained in said order distributor for inhibiting the operation of said normally transmitting means, means for performing a logical operation on the data in one of said registers in accordance with said second order part in said order distributor and in accordance with the constant part of the same instruction word, a translator connected to said mask register for deriving a control signal in accordance with the position in said mask register containing the least significant bit having a predetermined value, means responsive to a third order part being contained in said order distributor for controlling the operation of said transferring means and for controlling the transmission of the control signal derived by said translator to said logical operating means, and means responsive to said third order part being contained in said order distributor for controlling said logical operating means to operate on the data in one of said registers in a predetermined manner and in accordance with the control signal derived by said translator.

10. A data processor comprising a plurality of registers, an order distributor, means for transmitting successively stored instruction words to said order distributor, each of said instruction words including an order part and a constant part, means responsive to a first order part of an instruction word being contained in said order distributor for transferring data within said data processor in accordance with the instruction word contained in said order distributor, means responsive to a second order part being contained in said order distributor for performing a logical operation on the data in one of said registers in accordance with said second order part and in accordance with the constant part of the same instruction word, a translator connected to a predetermined one of said registers for deriving a control signal in accordance with the position in said predetermined register containing the least significant bit having a predetermined value, means responsive to a third order part being contained in said order distributor for controlling the operation of said transferring means and for controlling the transmission of the control signal derived by said translator to said logical operating means, and means responsive to said third order part being contained in said order distributor for controlling said logical operating means to operate on the data in one of said registers in a predetermined manner and in accordance with the control signal derived by said translator.

11. A data processor comprising a plurality of registers, an order distributor, means responsive to a first type of instruction word being contained in said order distributor for transferring data within said data processor in accordance with said instruction word, means responsive to a second type of instruction word being contained in said order distributor for performing a logical operation on the data in one of said registers in accordance with said instruction word, a translator connected to a predetermined one of said registers for deriving control information in accordance with the position in said predetermined register containing the least significant bit having a predetermined value, and means responsive to a third type of instruction word being contained in said order distributor for controlling the operation of said transferring means in accordance with said instruction word and for controlling the operation of said logical operating means in accordance with said derived control information.

12. A data processor in accordance with claim 11 wherein said last-mentioned means controls the operation of said logical operating means in part in a predetermined manner and in part dependent upon said derived control information.

13. A data processor comprising a plurality of registers, an order distributor, means responsive to a first type of instruction word being contained in said order distributor for transferring data within said data processor in accordance with said instruction word, means responsive to a second type of instruction word being contained in said order distributor for performing a logical operation on the data in one of said registers in accordance with said instruction word, a translator connected to a predetermined one of said registers for deriving control information in accordance with the data contained in said predetermined register, and means responsive to a third type of instruction word being contained in said order distributor for controlling the operation of said transferring means in accordance with said instruction word and for controlling the operation of said logical operating means in accordance with said derived control information.

14. A data processor comprising memory means defining a plurality of memory locations, an instruction word register, means responsive to a first type of instruction word being contained in said instruction word register for transferring data within said data processor in accordance with said instruction word, means responsive to a second type of instruction word being contained in said instruction word register for performing a logical operation on the data in one of said memory locations in accordance with said instruction word, a translator responsive to the data contained in a predetermined one of said memory locations for deriving control information dependent upon said data, and means responsive to a third type of instruction word being contained in said instruction word register for controlling the operation of said transferring means in accordance with said instruction word and for controlling the operation of said logical operating means in accordance with said derived control information.

15. A data processor comprising means defining a plurality of memory locations, an instruction word register, means responsive to a first type of instruction word being contained in said instruction word register for performing a first type of data processing operation in accordance with said first type of instruction word, means responsive to a second type of instruction word being contained in said instruction word register for performing a second type of data processing operation in accordance with said second type of instruction word, means responsive to the data contained in a predetermined one of said memory locations for deriving control information, and means responsive to a third type of instruction word being contained in said instruction word register for controlling the operation of said first data processing operating means in accordance with said third type of instruction word and for controlling the operation of said second data processing operating means in accordance with said derived control information.

16. A data processor comprising an instruction word register, means responsive to a first type of instruction word being contained in said instruction word register for performing a first type of data processing operation in accordance with said first type of instruction word, means responsive to a second type of instruction word being contained in said instruction word register for performing a second type of data processing operation in accordance with said second type of instruction word, and means responsive to a third type of instruction word being contained in said instruction word register for controlling the operation of said first data processing operating means in accordance with said third type of instruction word and for controlling the operation of said second data processing opearting means in accordance with the data processing operation performed by said first data processing operating means.

17. A data processor comprising
means defining a plurality of memory locations,
an order distributor containing therein an instruction word,
means responsive to a first type of instruction word being contained in said order distributor for transferring data between two of said memory locations in accordance with said first type of instruction word,
means responsive to a second type of instruction word being contained in said order distributor for shifting the data in one of said memory locations in accordance with said second type of instruction word,
and means responsive to a third type of instruction word being contained in said order distributor for controlling the operation of said transferring means in accordance with said third type of instruction word and for controlling the operation of said shifting means in part in accordance with said third type of instruction word and in part in accordance with the data contained in a predetermined one of said memory location.

18. A data processor comprising
means defining a plurality of memory locations,
an instruction register,
first means for performing a first type of data processing operation dependent upon the data stored in a group of said memory locations responsive to a first type of instruction word being contained in said instruction register,
second means for performing a second type of data processing operation responsive to a second type of instruction word being contained in said instruction register,
and means responsive to a third type of instruction word being contained in said instruction register for controlling the operation of said first means in accordance with said third type of instruction word and for controlling the operation of said second means in part in accordance with said third type of instruction word and in part in accordance with some of the data upon which the operation of said first means is dependent.

19. A data processor comprising
a memory store,
an order distributor containing an instruction word,
a plurality of data processing means each responsive to a respective type of instruction word being contained in said order distributor for operating in accordance with said respective type of instruction word,
and means responsive to a predetermined type of instruction word being contained in said order distribution for controlling the operation of a first one of said data processing means in accordance with said predetermined type of instruction word and for controlling the operation of a second one of said data processing means in accordance with the operation of said first data processing means.

20. A data procesor comprising
a plurality of registers,
a mask register,
a masking circuit,
a translator connected to said mask register for deriving a shift magnitude in accordance with the bit position of a mask word in said mask register containing the least significant bit having a predetermined value,
and means responsibe to a single order for causing said masking circuit to mask a data word in accordance with the mask word in said mask register and to shift said data word thus masked in one of said plurality of registers in a predetermined manner and in accordance with the shift magnitude derived by said translator.

21. A data processor comprising
a plurality of registers,
a mask register,
a masking circuit,
an order distributor,
means responsive to a predetermined type of instruction word being contained in said order distributor for masking a data word in said masking circuit by the mask contained in said mask register and for writing the resulting masked data word in one of said plurality of registers,
a translator connected to said mask register for deriving a shift magnitude depending upon the least significant bit in said mask having a predetermined value,
and means responsive to said predetermined type of instruction word being contained in said order distributor for shifting said masked data word written in said one of said registers in accordance with the shift magnitude derived by said translator.

22. A data processor comprising
means defining a plurality of memory locations,
a plurality of registers,
a mask register,
an instruction word register,
means responsive to a first type of instruction word being contained in said instruction word register for masking the data word in one of said memory locations by the mask word contained in said mask register and for writing the resulting masked data word in one of said registers,
means responsive to a second type of instruction word being contained in said instruction word register for shifting the data word in one of said registers in accordance with said second type of instruction word,
and means responsive to a third type of instruction word being contained in said instruction word register for controlling said masking and writing means to mask the data word in one of said memory locations by the mask word in said mask register and to write the resulting masked data word in one of said registers, and for controlling said shifting means to shift the resulting masked data word in said one register a number of positions depending upon the least significant bit in said mask word having a predetermined value.

23. A data processor comprising
an order distributor containing an instruction word,
means responsive to a first type of instruction word being contained in said order distributor for transferring a data word within said data processor and for masking said transferred data word by a mask word,
means responsive to a second type of instruction word being contained in said order distributor for shifting a data word in said data processor,
and means responsive to a third type of instruction word being contained in said order distributor for controlling said transferring and masking means to transfer a data word within said data processor and to mask said transferred data word by a mask word, and for controlling said shifting means to shift said transferred masked data word in accordance with the least significant bit in said mask word having a predetermined value.

24. A data processor comprising
a memory for storing data words,
a mask register containing a mask word,
means for representing an instruction,
means for transferring a data word within said data processor and for masking said transferred data word by the mask word in said mask register in accordance with said instruction, and means for shifting said masked transferred data word in a predetermined manner and a number of positions depending upon said mask word in accordance with said instruction.

References Cited

UNITED STATES PATENTS

| | | | |
|---|---|---|---|
| 3,111,648 | 11/1963 | Marsh et al. | 340—172.5 |
| 3,161,763 | 12/1964 | Glaser | 340—172.5 |
| 3,229,260 | 1/1966 | Falkoff | 340—172.5 |
| 3,251,037 | 5/1966 | Coil et al. | 340—172.5 |
| 3,274,558 | 9/1966 | Sharp et al. | 340—172.5 |
| 3,275,989 | 9/1966 | Glaser et al. | 340—172.5 |
| 3,277,449 | 10/1966 | Shooman | 340—172.5 |

OTHER REFERENCES

Burns, W. E., et al., Method For Generating Masking Functions, in IBM Tech. Discl. Bulletin 5(7): p. 84–85, December 1962.

PAUL J. HENON, *Primary Examiner.*

JOHN P. VANDENBURG, *Assistant Examiner.*